United States Patent [19]
Pomerene et al.

[11] Patent Number: 4,807,110
[45] Date of Patent: Feb. 21, 1989

[54] PREFETCHING SYSTEM FOR A CACHE HAVING A SECOND DIRECTORY FOR SEQUENTIALLY ACCESSED BLOCKS

[75] Inventors: James H. Pomerene, Chappaqua; Thomas R. Puzak, Yorktown Heights; Rudolph N. Rechtschaffen, Scarsdale, all of N.Y.; Frank J. Sparacio, North Bergen, N.J.

[73] Assignee: International Business Machines Corporation, Armonk, N.Y.

[21] Appl. No.: 597,801

[22] Filed: Apr. 6, 1984

[51] Int. Cl.[4] .......................... G06F 9/38; G06F 12/12
[52] U.S. Cl. ................................................... 364/200
[58] Field of Search ... 364/200 MS File, 900 MS File

[56] References Cited

U.S. PATENT DOCUMENTS

| | | | |
|---|---|---|---|
| 3,898,624 | 8/1975 | Tobias | 364/200 |
| 4,157,587 | 6/1979 | Joyce | 364/200 |
| 4,168,541 | 9/1979 | Dekarske | 364/200 |
| 4,189,770 | 2/1980 | Gannon | 364/200 |
| 4,195,343 | 3/1980 | Joyce | 364/200 |
| 4,322,795 | 3/1982 | Lange et al. | 364/200 |
| 4,332,010 | 5/1982 | Messina | 364/200 |
| 4,400,793 | 8/1983 | Schuenemann | 364/900 |
| 4,490,782 | 12/1984 | Dixon | 364/200 |
| 4,521,851 | 6/1985 | Trubisky | 364/200 |
| 4,583,165 | 4/1986 | Rosenfeld | 364/200 |

OTHER PUBLICATIONS

R. Rechstschaffen, "Cache Miss History Table", *IBM TDB*, vol. 25, No. 11B, Apr. 1983, pp. 5978–5980.

Primary Examiner—Archie E. Williams, Jr.
Assistant Examiner—Florin Munteanu
Attorney, Agent, or Firm—George E. Clark; Terry J. Ilardi

[57] ABSTRACT

A prefetching mechanism for a system having a cache has, in addition to the normal cache directory, a two-level shadow directory. When an information block is accessed, a parent identifier derived from the block address is stored in a first level of the shadow directory. The address of a subsequently accessed block is stored in the second level of the shadow directory, in a position associated with the first-level position of the respective parent identifier.

With each access to an information block, a check is made whether the respective parent identifier is already stored in the first level of the shadow directory. If it is found, then a descendant address from the associated second-level position is used to prefetch an information block to the cache if it is not already resident therein. This mechanism avoids, with a high probability, the occurrence of cache misses.

17 Claims, 6 Drawing Sheets

FIG. 2A

CACHE

| | LINE 0 | LINE 1 | LINE 2 | LINE 3 | |
|---|---|---|---|---|---|
| | | | | | ROW 0 |
| | | | | | ROW 1 |
| | | | | | ROW 2 |
| 19— | | | | | ROW 3 |
| | | | | | ROW 4 |
| | | | | | ROW 5 |
| | | | | | ROW 6 |
| 17— | | | | | ROW 7 |

(128 BYTES)

FIG. 2B

REAL DIRECTORY 11

| | ADDR 0 | ADDR 1 | ADDR 2 | ADDR 3 | |
|---|---|---|---|---|---|
| | | | | | ROW 0 |
| | | | | | ROW 1 |
| | | | | | ⋮ |
| | | | | | |
| | | | | | |
| | | | | | |
| | | | | | |
| 21— | | | | | ROW 7 |

(24 BITS)

FIG. 3

SHADOW DIRECTORY 23

| | CELL 0 | CELL 1 | CELL 2 | CELL 3 | CELL 4 | CELL 5 | CELL 6 | CELL 7 | |
|---|---|---|---|---|---|---|---|---|---|
| | | | | | | | | | ROW 0 |
| | | | | | | | | | ROW 1 |
| | | | | | | | | | ⋮ |
| | | | | | | | | | |
| | | | | | | | | | |
| | | | | | | | | | |
| | | | | | | | | | |
| 25— | | | | | | | | | ROW 7 |

(49 BITS)

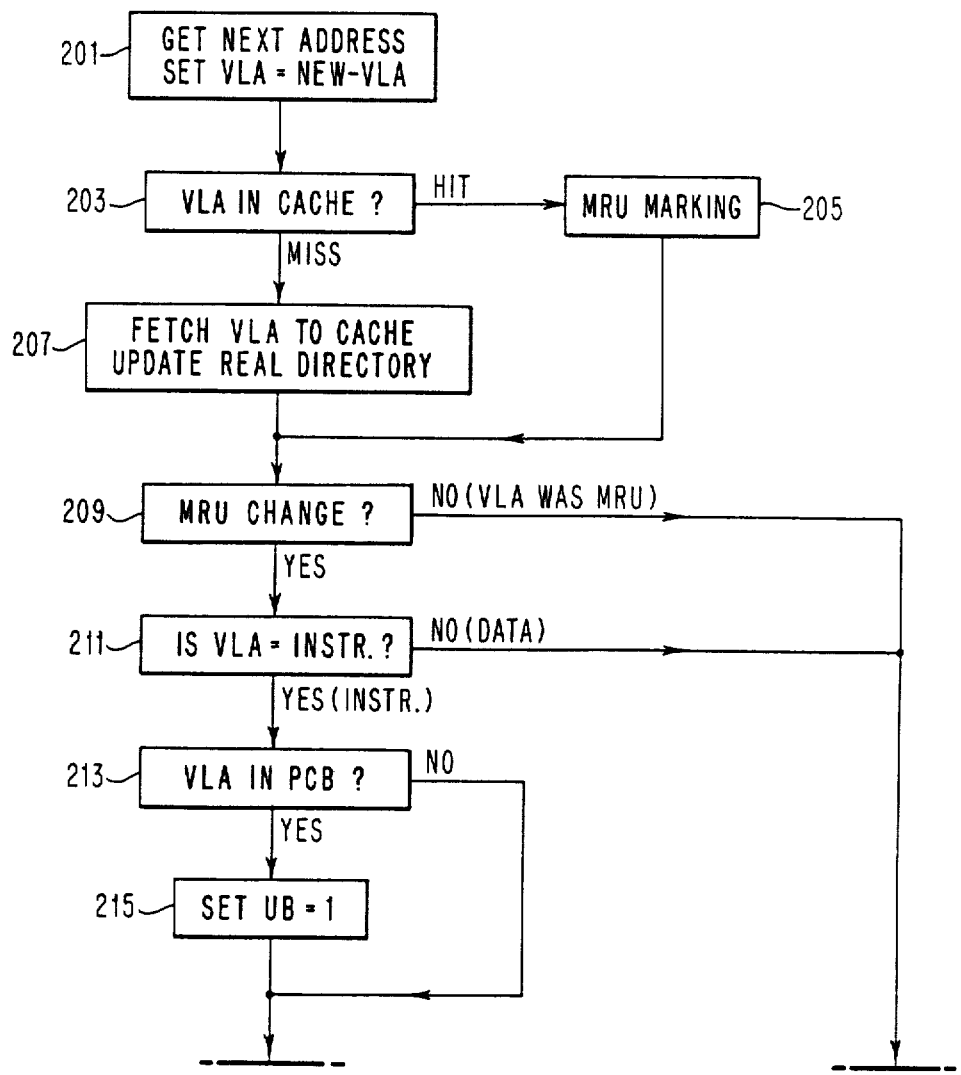

PREFETCHING SYSTEM FOR A CACHE HAVING A SECOND DIRECTORY FOR SEQUENTIALLY ACCESSED BLOCKS

FIELD OF THE INVENTION

Present invention is concerned with the operation of a cache buffer store in a data processing system. More particularly, it is concerned with a procedure for prefetching blocks of information to a high speed buffer store, and with a cache buffer storage arrangement for enabling prefetching of information lines from main store.

BACKGROUND AND PRIOR ART

In many data processing systems, there is provided between the working store of the central processing unit and the main store, a high speed buffer storage unit which is commonly called a "cache". This unit enables a relatively fast access to a subset of data and instructions which were previously transferred from main storage to the cache, and thus improves the speed of operation of the data processing system. The transfer of operands or instructions between main store and cache is usually effected in fixed-length units which are called blocks or "lines" of information. The selection of lines for transfer to the cache, and also their location in cache (except for a possible pre-assignment of classes to cache sub-areas) depend on the respective program, the operands used, and the events that happen during program execution.

To enable retrieval of information from the cache, a table of tags or line addresses is maintained in a "directory" which is an image of the cache. Each line residing in cache has its tag or address stored in the respective position in the directory. Once the cache is filled-up, new information can only be entered if an old block or line of information is deleted or overwritten. Certain procedures are necessary to select lines as candidates for replacement, and to update the directory after a change of the cache contents.

A number of systems are known in the art which use cache or high speed buffer stores and provide a mechanism for replacement selection and directory updating.

U.S. Pat. No. 4,322,795 to R. E. Lange et al. discloses a cache memory arrangement using a least-recently-used scheme for selecting a cache location in which to store data fetched from main memory upon a cache miss. A directory which stores tag address bits of data available in cache is provided in duplicate for each cache to improve operation in a multiprocessor system having multiple caches. Both directories have the same contents, i.e. the tags for data (operands, instructions) presently in cache. One directory is used as usual for retrieval of requested data. The other is used for comparing the address of data stored in the cache of its associated CPU A to the addresses of data changed in main memory by another processor, CPU B. The data stored in the cache of CPU A must be invalidated if they were changed in main store by another CPU, and the duplicate directory is a tool for this process.

U.S. Pat. No. 4,332,010 to B. U. Messina et al. describes a cache buffer system using a directory which is subdivided into classes. Due to some overlap in translatable and non-translatable portions in the addresses used, and depending on where the data is stored actually in cache, there may be either a miss, or a principal hit in one specific class, or a synonym hit in other classes when an access is tried. The system disclosed solves the problem of possible time loss when only a synonym hit will occur, by addressing and searching all classes of the directory simultaneously so that if no principal bit occurs, the synonym hit is available immediately.

U.S. Pat. No. 4,168,541 to C. W. DeKarske discloses a replacement system for a set associative cache buffer, i.e. a cache which is subdivided into sets each associated with a class of data having some address bits in common. The system uses age bits to determine the least recently used (LRU) block in a set. The age bits are updated each time a block is referenced. A directory (tag buffer) is provided for storing tags representing a portion of the address bits of data words currently in the cache memory. The patent describes details of updating the directory and the age bits.

U.S. Pat. No. 4,189,770 to P. M. Gannon et al. describes a cache bypass control for operand fetches. In the disclosed system, if a cache miss occurs and a line must be fetched from main storage, that portion (operands) of the fetched line, which was requested and is immediately needed is directly transferred to the I-Unit via a cache bypass. This avoids the time delay caused by waiting until the complete line had been transferred to the cache, thus allowing faster operation and improving efficiency of the system. U.S. Pat. No. 4,195,343 to T. F. Joyce discloses a replacement procedure for a cache store which is organized in levels. Selection of locations in which replacement occurs if new data are to be placed into the cache is done by a round-robin mechanism.

None of the prior art references discloses the anticipatory fetching, or prefetching into the cache buffer store of information that was not yet requested, to thus reduce the probability of a cache miss if that information is actually requested subsequently.

SUMMARY OF THE INVENTION

It is an object of the invention to devise a procedure and a cache buffer system for enabling the efficient prefetching of information from main store to cache to increase the probability that information when it is actually requested, is already available in the high speed buffer store.

It is another object to devise a prefetching mechanism for a cache buffer store, which selects the information blocks or lines in such a way that there is a high rate of actual usage for the prefetched information.

These objects and other advantages are achieved by the invention which is defined in the claims.

The problem solution is mainly achieved by the provision of a secondary or shadow directory which stores parent-descendant pairs, each pair consisting of a parent identifier obtained during a previous line access and an associated descendant address obtained during a subsequent line access, and by prefetching, if a stored parent identifier occurs again, the line designated by the associated descendant address. By making the shadow directory larger than the actual (real) directory of the cache, the shadow directory can store parent identifiers not only for lines presently residing in store, but also for lines that were replaced already, thus increasing the prefetching potential. By the disclosed updating mechanism for the shadow directory, unefficient parent-descendant pairs can be eliminated and preference can be given to pairs having a higher probability of recurring.

By providing a shadow directory of modest size in comparison to the cache, and using it to select information lines for anticipatory fetching, the probability of cache hits is increased without the necessity of increasing the cache size, as would otherwise be required.

An embodiment of the invention is described in the sequel with reference to the drawings.

BRIEF DESCRIPTION OF THE DRAWINGS

FIGS. 2A and 2B show the organization of the cache and its real directory as known from the prior art and used in the embodiment of present invention;

FIG. 3 shows the organization of the shadow directory that is used in combination with the cache and real directory of FIGS. 2A and 2B;

FIG. 6 comprising FIGS. 6A, 6B, and 6C are flow diagrams of a procedure implementing the invention, including the prefetching of a line to the cache and the updating of the shadow directory.

DEAILED DESCRIPTION

(A) BASIC CONCEPT OF INVENTION

As was mentioned in the introduction, the invention provides a technique for efficiently prefetching blocks of information (called "lines" in the following) from main storage into the cache (high-speed buffer storage) of a data processing system, so that the number of cache misses is reduced.

Figure 1:
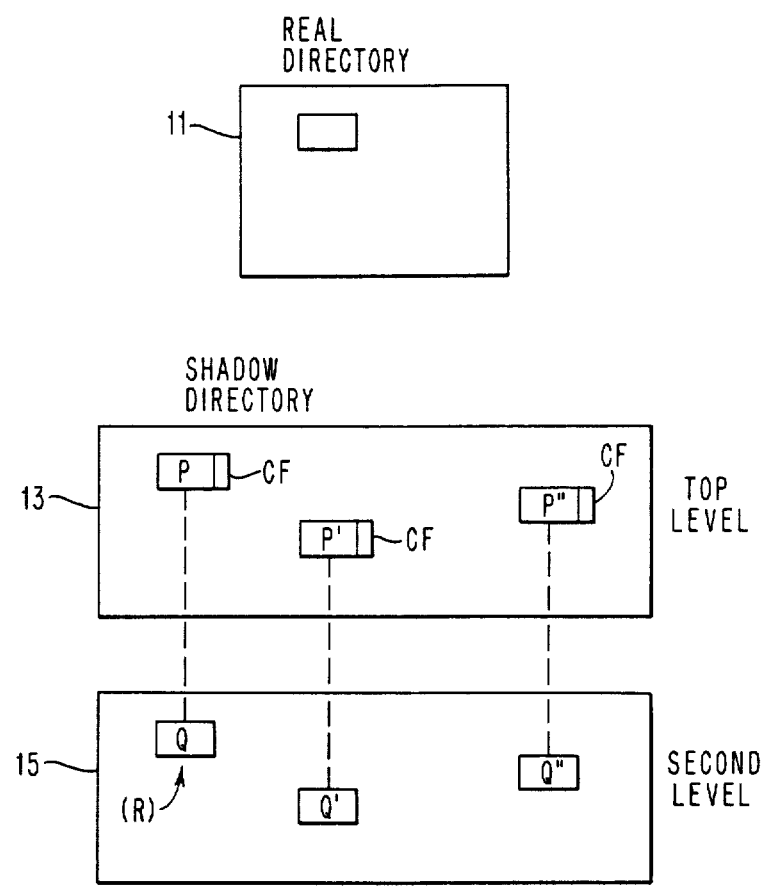
FIG. 1 illustrates the principle of the two-level shadow directory of the invention in connection with the real directory.

FIG. 1 depicts the principle of present invention. For the cache storage, a directory 11 is provided as usual which holds the addresses of those lines (instructions, data, operands) that are currently in the cache. This standard directory is called the "real directory", and it allows to determine whether a desired line is already in cache, and in which position it is.

According to the invention, an additional two-level directory (13, 15) is provided which is called the "shadow directory", or "shadow" in short form. This shadow directory holds in its top or first level (13) addresses (P, P', P'') of lines which presently are or recently were stored in the cache. For each entry in the first level, there is a corresponding entry in the second level (15) which holds an address (Q, Q', Q'') that was subsequently accessed after the respective address in the first level.

In other words, if in one access cycle a storage access was made to address P, and in a subsequent cycle an access was madde to address Q, the top level entry will hold P and the second level entry will hold Q. The "subsequent" cycle may be the immediately following next access cycle, or it may be a later access cycle which involves a cache miss and main storage fetch, or which involves a change of some usage-age indicators for the cache and its directory.

With some probability, sequences of storage accesses are repeated. The arrangement of FIG. 1 allows, when access to address P is made again, to take address Q from the second level of the shadow and to prefetch the respective line into cache, though at that time it is not yet known whether Q will actually follow P (as it did previously). Due to such prefetching mechanism, the probability that a line when needed is in the cache already is essentially increased, or in other words, the number of cache misses which always cause delays is drastically reduced.

In order to be efficient, the shadow directory must be of much larger size than the real directory because it should hold in its first level not only addresses of lines actually in cache but also of lines that were already replaced in cache but have some probability of being used again soon because they were used recently. Depending on the application, the number of entries in the shadow top level could be twice as much or even eight times as much as the number of entries in real directory.

Furthermore, an updating procedure is necessary for the contents of the shadow directory. Adding new entries and deleting old entries P in the top level is done in the same way as in the real directory: An age tag (MRU-LRU indication) is maintained for each entry, and when a new address P is to be entered in first level 13 because it was entered in real directory 11, it replaces the oldest entry P or P' or P''. As the use of MRU/LRU age tags and the procedures by which new entries replace older entries are well known techniques in storage operation, they will not be described in this specification in detail.

Updating of the second level entries Q is made as a consequence of actual address sequences: After P was newly added in first level 13 in one access cycle, Q will be added to second level 15 (in the corresponding position) subsequently. Later on, when P is used again, a check is made whether Q again follows P. A confirmation bit CF is provided with each first level entry to reflect the result of this test, i.e. whether Q is still a "good" entry (i.e. a probable follower to P) or not. Q should finally be replaced by another address R which recently followed P thus reflecting the recent history of storage accesses and to have a better candidate for prefetching.

To summarize, for the prefetching mechanism, a two-level shadow directory is provided in addition to the normal cache directory, and each storge access cycle is amended to include following operations:

(a) Access the cache buffer storage with a given current address. If line is missing, fetch it from main storage, update real directory by entering respective address. Update MRU-LRU tags. (This is the normal known access procedure).

On an appropriate subset of storage accesses the following actions are performed. The appropriate subset need not include every access. The mechanism need be invoked only for those accesses which change the status (age-tags) or contents of the cache.

(b) Check shadow directory whether a "good" pair P-Q is available with current address P in first level. Prefetch the line given by Q to cache (if it is not already there). Update real directory.

(c) Update contents of shadow directory:
  (c1) If current address was missing, enter it in top level (P), leaving second level (Q) open.
  (c2) Enter current address in second level (Q') under previously used address (P') under certain conditions.
  (c3) Invalidate a pair (P''-Q'') in the shadow directory if a previously prefetched line (Q'') was not used (by resetting CF bit to zero).

More details of the shadow directory and above outlined procedure will be given in subsequent sections.

The prefetch mechanism of present invention has the same effect as if a much larger cache buffer storage were provided than is actually available, because fewer misses occur than in a conventional system. However, instead of enlarging the cache by a number of full-size storage locations (e.g. each line having 128 bytes) only an additional directory is required which has much smaller entries (e.g. 6 bytes for each address pair).

(B) DEFINITION OF TERMS

In this section, the meaning of several terms which are used in this specification is explained to simplify understanding of the description.

A "LINE" is a block of information, either instructions or operands (data), that is stored in consecutive storage locations and is transferred as an entity, e.g., between main storage and cache (high-speed buffer).

An "ACCESS CYCLE" or "CYCLE" is the sequence of operations that are necessary for accessing one line in storage when its address is given. E.g., if first an instruction and then two operands are accessed in storage, there will be three consecutive access cycles.

An "AGE TAG" is a bit group assigned to an entry in storage (address in directory) which indicates whether in a given group of entries, the respective entry was most recently used (MRU), least recently used (LRU), or which relative usage age it has between the MRU and LRU entries.

A "CONGRUENCE CLASS" is a subset of lines that have a common characteristic, i.e. all lines having addresses in which the last n bits are identical.

Now consider a sequence of three addresses R, S, and T of which the intermediate one, S, is presently used. For such an address triple, following designations will be used (VLA = virtual line address):

| | |
|---|---|
| R = Prior Address = | OLD-VLA |
| S = Current Address = | VLA |
| T = Next Address = | NEW-VLA |

In this sequence, two consecutive addresses, P and Q, form a pair and will be designated as follows:

| | |
|---|---|
| P = Parent (Address) = | PAR-A |
| Q = Descendant (Address) = | DSC-A |

From the above shown address triple R, S, T it is clear that any current address is involved in two pairs in different functions. In the pair R-S, R is the parent and S the descendant. In the pair S-T, S is the parent and T the descendant. These distinctions are important for the updating of the shadow directory because this updating has a retrospective and a prospective aspect.

It should be noted that as an alternative to a plain parent address, a "parent identifier" which is the combination of portions from different addresses could be used in certain situations. This will be explained in section (F). However, the term "parent address" (or just "parent") will be used in the sequel.

(C) ORGANIZATION OF CACHE STORAGE AND DIRECTORIES

In the following, a description is given how the cache buffer storage and its directories are organized. It should be noted, however, that this organization is only an example for describing an embodiment of the invention, which per se can be used with various cache and directory organizations not shown here.

(C1) CACHE BUFFER STORAGE AND REAL DIRECTORY

The basic operation of a cache and its directory in connection with a complete data processing system, as well as their principal design, need not be described here in detail because such descriptions were given already e.g. in above-mentioned prior art patents.

FIG. 2A shows the organization of the cache. The cache has storage space for a number of lines (data or instructions), in this case 32 lines. Each line has a capacity of 128 bytes. The lines 17 are organized in eight rows, four lines per row. Each row 19 is assigned to one congruence class, e.g., to all lines of which the virtual addresses or main storage addresses have identical three last bits. For example, the four line spaces of row 2 would be assigned to all lines having addresses ending in . . . 010, or those of row 7 would be assigned to all lines having addresses ending in . . . 111. This provides a somewhat random distribution resulting in an even utilization of the cache space and avoids an additional hashing scheme. However, items having consecutive addresses will be stored in different rows.

Of course, all numbers for line length, cache capacity etc. given above, are only examples and could be modified.

The normal directory for the cache storage, which is called in present description the real directory, has exactly the same organization as the cache, as can be seen in FIG. 2B. For each storage line in cache, there is a corresponding address entry cell 21 in the real directory. However, the capacity of each cell 21 for one address is e.g., only 24 bits (in contrast to the corresponding line storage capacity in cache which is 128 bytes). To retrieve a line from the cache, its address is first used to determine the congruence class, i.e., the assigned cache row. Then the four entries in the respective row in real directory are compared to the given line address. Upon coincidence, the locatin of the matching address in the directory indicates where the line is stored in cache and can be accessed.

An age tag is maintained for each entry in the directory, but the age tages are independent for each row or congruence class. Thus, a two-bit tag can indicate which entry of a row was most recently used, least recently used, etc. When an address and its corresponding entry in cache are accessed, it gets the MRU age tag value, and the tag values for the other addresses are updated to reflect this. If a new line is to be entered into cache, the LRU address entry of the respective congruence class (row) is found, and this determines the locations in cache and directory where the new line and its address, respectively, are to be stored (replacing the old line and its address, respectively). As LRU replacement procedures are well known, they need not be explained here in more detail.

(C2) SHADOW DIRECTORY

Whereas the cache and real directory of FIGS. 2A and 2B are standard items, the invention suggests to add a shadow directory 23 as shown in FIG. 3 which has a similar organization as, but is much bigger than the real directory.

The shadow is also organized in rows, i.e. by congruence classes, but each row has a larger number of entry cells 25 than in the real directory, e.g. eight entry cells per row. Thus, in this example the shadow 23 has 64 entry cells in contrast to the 32 entry cells of real directory 11 (and the 32 line storage locations of the cache).

Figure 4:
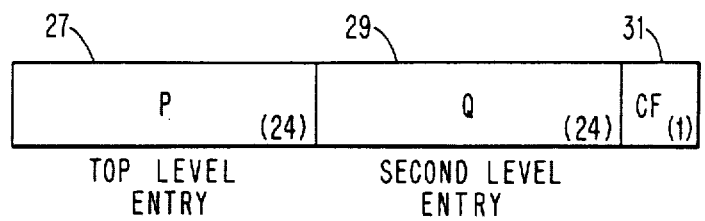
FIG. 4 depicts details of an entry cell of the shadow directory of FIG. 3, implementing the two-level principle shown in FIG. 1.

Each of the entry cells 25 in shadow 23, of which one is shown in FIG. 4, has e.g. a capacity of 49 bits to accomodate a first level entry 27 (address P) of 24 bits, a second level entry 29 (address Q) of 24 bits, and a confirmation bit 31 (CF). This organization corresponds to the principle shown in FIG. 1. Though the shadow could be so arranged that the first level entries are in one storage block and the second level entries in another storage block both having the same number of entries, the solution chosen for the disclosed embodiment of the invention is that shown in FIGS. 3 and 4, i.e. having one block of entry cells each accommodating an address pair constituting the top and second level address.

With reference to the terminology given in section (B), each shadow directory cell 25 can hold a parent address PAR-A in its first level entry 27 (address P), and a descendant address DSC-A in its second level entry 29 (address Q). Confirmation bit CF indicates whether the pair P-Q is a valid prefetching pair. If CF=1, the stored pair P-Q is good, if CF=0, the stored pair should not be used, or no address is stored in the one or other portion (P or Q).

As in the real directory, an age tag is also maintained for each cell in the shadow directory. These age tags are separate by row (or congruence class) so that in each row there will be one MRU entry, one LRU entry, the other entries being intermediately valued. Thus, a three-bit age tag would be sufficient for each of the eight entries of each congruence class. When a first level entry (P in 27) is referenced to obtain a second level entry for prefetching, or when a new first level entry is entered, it is made MRU. The other first level entries' age tags of that row will be updated. If space is required for a new entry, the LRU entry is overwritten (resetting its CF bit to zero).

Inserting and deleting of first level and second level entries in the shadow and updating of CF bits will be described in more detail in a later section.

(C3) PREFETCH CONFIRMATION BUFFER

Figure 5:
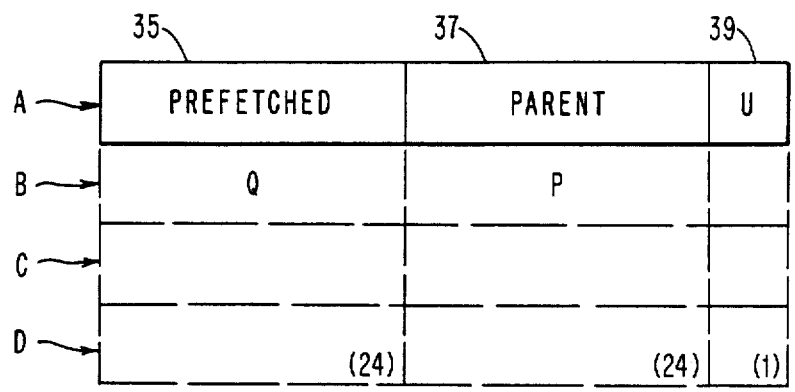
FIG. 5 shows the organization of a prefetch confirmation buffer that is used for updating the contents of the shadow directory.

For implementing the prefetch mechanism of the invention, a supplementary unit can be provided to assist the updating procedure for the shadow directory. This supplementary unit is the prefetch confirmation buffer (PCB) 33 shown in FIG. 5. It consists of at least one buffer register comprising a field 35 for a prefetched address, a field 37 for a parent address, and a bit field 39 for a usage indicator bit (UB). Whenever a line is prefetched to the cache, its address Q (from the second level of the shadow) as well as the address P of its parent (from the first level of the shadow) will be stored in fields 35 and 37, respectively. Later on, when it is determined that the prefetched address was actually used bit UB is set to "1".

Instead of only one register (A), the PCB may comprise two (A and B), four (A, B, C, D) or even more registers. The purpose of such an extended prefetch confirmation buffer (PCB) will be explained in a later section. If the PCB has a plurality of registers, an age tag will be maintained for each register to enable determination of the MRU, LRU etc. entries.

(D) DETAILS OF STORAGE ACCESSING PROCEDURE INCLUDING PREFETCHING AND SHADOW DIRECTORY UPDATING

Figure 6B:
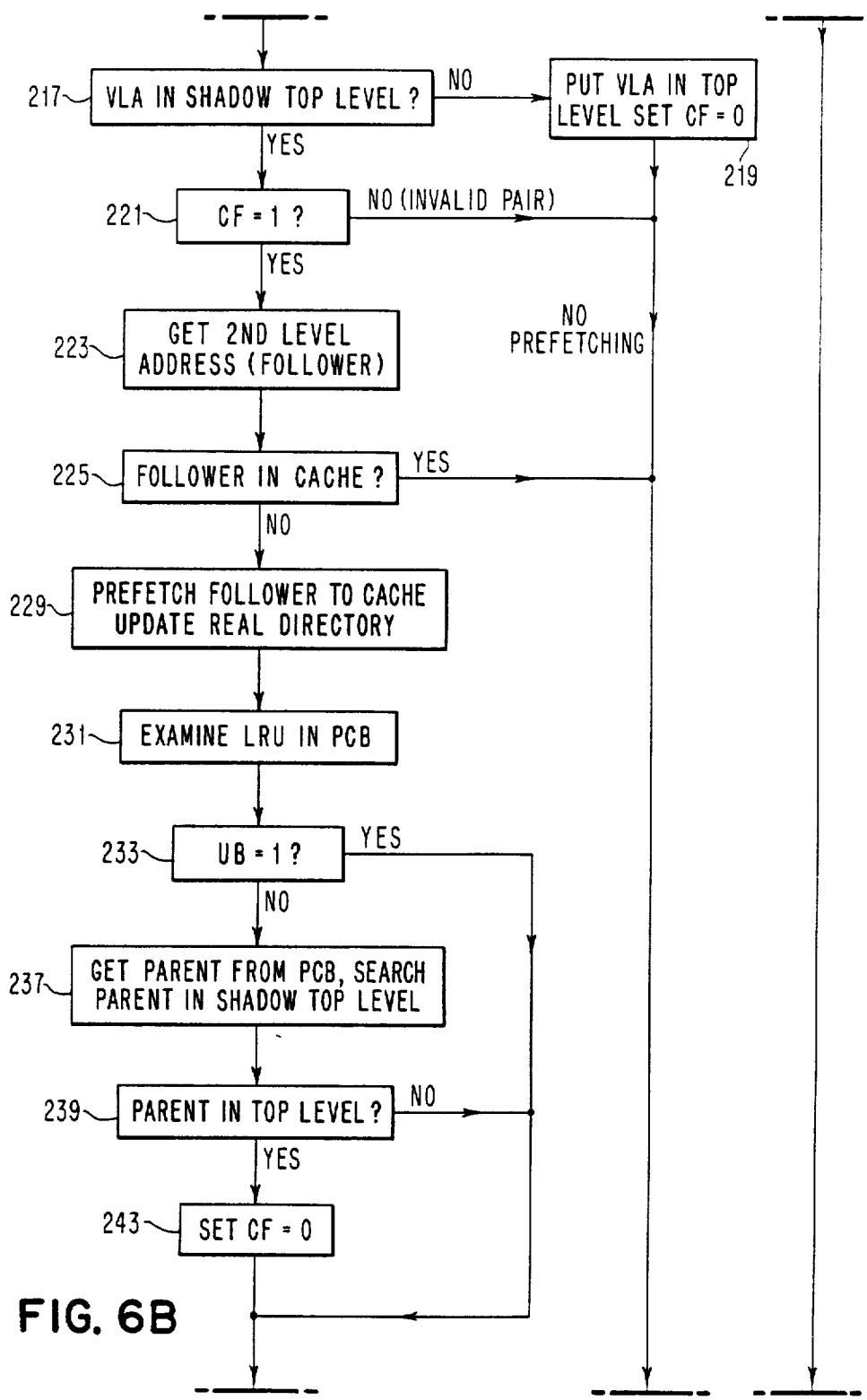
Figure 6C:
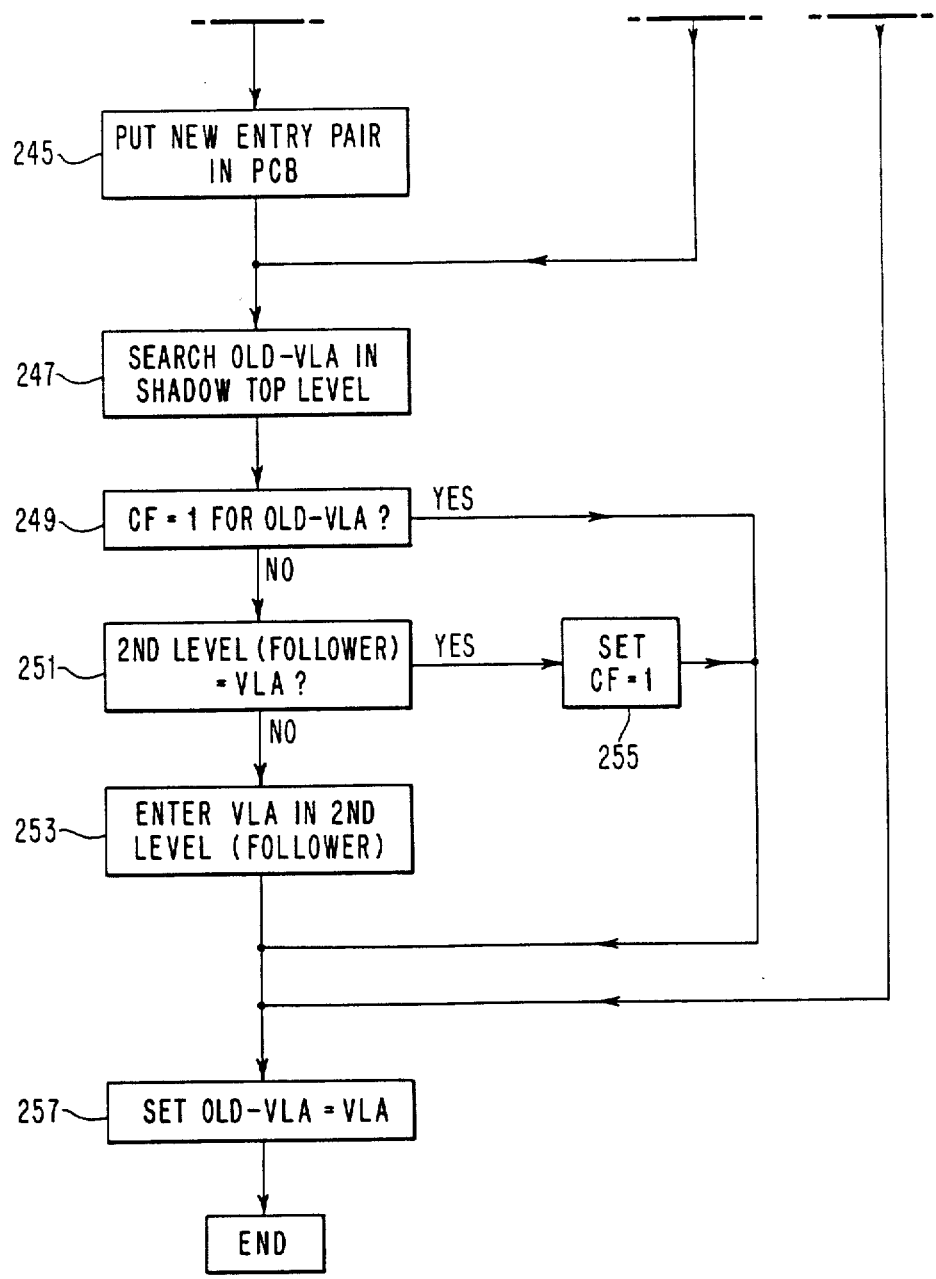

FIG. 6 is a flowchart of a storage accessing procedure which uses the shadow directory and prefetching mechanism of present invention. The principal operations in this procedure are those which were already mentioned in section (A) above: (a) Accessing cache with current address, including a line fetch (if necessary) and updating of real directory; (b) Testing whether a good descendant candidate is known, and prefetching it (if not in cache already); (c) Updating shadow directory by entering a new descendant candidate and by validating good descendant candidates and invalidating bad descendant candidates.

(1) Getting next address, accessing cache, and updating real directory:

To start a storage access cycle with step 201, the system takes the next line address and makes it the current address (SET VLA=NEW-VLA) which is then designated as VLA throughout the cycle. In step 203, a search is made to determine whether the line having address VLA is already in cache. For this purpose, all entries in real directory of the congruence class or row associated with VLA are compared to VLA. In case of a hit, the respective entry is marked MRU (step 205) if it was not MRU already, and its position code is given to the system for accessing the line in cache. In case of a miss, step 207 is executed: The line having address VLA is fetched from main store, transferred to the processor, and also stored in cache in a position that is given by the LRU entry of the respective row in real directory. VLA is then entered into real directory as MRU, replacing the LRU entry.

(2) Eliminating certain cases from prefetching procedure:

In the next two steps, the storage access cycle is ended under certain conditions, i.e. no prefetching and shadow directory updating are effected in these cases. In step 209, a determination is made whether the cache access resulted in an MRU change (an MRU change occurs if a new entry is placed into the directory, or if an old entry is used which was not MRU; the MRU change condition can be used to set a latch which is tested in step 209). If there was no MRU change, it can be assumed that for the respective address VLA a prefetch operation and shadow updating were effected already in a previous access cycle. Therefore, one can omit steps 211 . . . 255 and go to the end of the cycle. If there actually was an MRU change, all these steps must be executed.

In step 211, a determination is made whether the current access to the cache is for instructions or for data (operands). As will be explained in a later section, the prefetching and shadow updating procedure could be restricted to instruction accessing cycles.

To avoid undue complexity, we are here describing the prefetch for instructions only. This is tested in step 211. If the access was for data the cycle is terminated after step 211.

(3) Updating PCB (setting usage bit UB):

In step 213, a test is made whether VLA is in the "prefetched" address field (35) of the prefetch confirmation buffer 33. If this is true, then the usage bit in position UB (39) is set to "1" in step 215 to indicate that the previously prefetched line was now actually used, i.e. the prefetch was a good choice. On the other hand, if a prefetched line will not actually be used, the usage bit in the respective PCB entry will remain at "zero". This indicates that the prefetch was actually a "misfetch" and the respective parent-descendant pair which caused the prefetch should be invalidated (this will be done in steps 233 . . . 243).

(4) Updating shadow (entering new entry), preparation of prefetch, and actual prefetch:

As was mentioned already, each address that is entered into the real directory is also entered into the shadow. For this purpose, in each cycle in step 217 a determination is made whether the current address VLA is in the shadow already. All first level entries (13 in FIG. 1, 27 in FIG. 4) in the respective row (congruence class) of the shadow directory 23 are compared to VLA. If VLA is not found, the LRU entry (oldest address) of the respective row is determined, and VLA is entered into that cell (step 219), making the entry MRU. The confirmation bit CF (31) of that cell is reset to zero, because the associated second level entry is invalid for the new first level entry. Thus, a new parent of a prefetch pair was stored in the shadow, but the respective descendant can be entered as second level entry only in a subsequent cycle (in step 255) when it is actually known. No prefetching can be done (because no descendant candidate is known) and all subsequent steps are omitted until step 247.

If VLA is found in step 217 as a first level (parent) entry in the shadow, a test is made in step 221 whether the confirmation bit CF is on. If not (CF=0), the second level entry (descendant) is invalid, no prefetch can be made, and all steps until step 247 are omitted.

If the confirmation is on (CF=1), then the second level entry (descendant) is a good choice and a prefetch can be attempted with the descendant address taken from field 29 (step 223).

In step 225, a determination is made whether the line which has the descendant address (second level address) happens to reside in cache already. For this purpose, the real directory is consulted (as in step 203 for a normal cache access). If the descendant address is found in real directory, no prefetch is necessary and all subsequent steps can be omitted until step 247.

If the descendant address is not present in real directory, the respective line is fetched into the cache in step 229 and the real directory is updated by entering the descendant address (replacing the LRU entry).

Thus, a new line was fetched into the cache because its use is anticipated in view of a known, previous address sequence (it may not be used later, but this possibility has low probability.

(5) Updating of PCB (evaluating oldest entry, entering new entry) and updating of shadow (confirmation bit resetting):

At this point in the procedure, an evaluation of the prefetch confirmation buffer can be made. The oldest entry (which will be the single entry in a single-register PCB or the LRU entry in a multiple-register PCB) is determined (step 231) and a test is made in step 233 whether the usage bit UB is on in that entry. If it is on (UB=1), the respective prefetched line has been actually used. Thus the prefetch pair (parent-descendant pair) which is stored in this oldest PCB entry and which is also resident as a valid pair in the shadow is a "good" pair and can remain valid in shadow. It can now be cancelled in the PCB by overwriting it in step 245 with a new entry.

If the usage bit is not on (UB=0) in the oldest PCB entry, the prefetched line had not been used, and this pair (parent-descendent) in PCB and in shadow is a "bad" pair and should be invalidated. Therefore, in step 237 the parent of the pair is taken from the PCB entry (field 37) and it is searched in the top level entries (27) of all shadow cells. If it is determined (step 239) that this "bad" parent address was anyway deleted in the shadow in the meantime, it need not be invalidated, and the respective PCB entry can be overwritten in step 245.

If, however, the "bad" parent address is found in one shadow cell, this entry is invalidated in step 243 by resetting the confirmation bit CF (31) to "zero". Thereafter, the respective PCB entry can be overwritten.

Now in step 245, a new entry can be entered into the prefetch confirmation buffer PCB if a prefetch had been made actually in this cycle in step 229. The new entry will replace the single entry (in a single-register PCB) or the oldest entry (in a multiple-register PCB) which had been evaluated in preceding steps 321 . . . 243. The new entry will consist of the prefetch address used in step 229, and the respective parent address which actually is the current address VLA of the present cycle. The usage bit UB will be reset to "zero", and will be set in some succeeding cycle to "1" only if the prefetched line is actually used.

(6) Final updating of shadow (setting of confirmation bit, entering descendent in second level):

At this stage of the procedure, a retrospective updating of the shadow will be made. The previous address OLD-VLA (i.e. the address that was current address VLA in the previous prefetech cycle) which is stored in a register is now searched in step 247 in the first level entries (27) of all cells in the shadow. This is done to check whether the respective address as a parent has a good descendent already, or to give it the current address VLA as new descendent in the shadow.

Described below is a mechanism that decides when to change a descendant address for a given parent address. The mechanism tests the setting of the confirmation bit CF to decide whether the parent-descendent address pair is a "good" address pair that will lead to a successful prefetch and should not be changed, or whether it is a "bad" address pair that may not lead to a successful prefetech so that a new descendent address for the respective parent address should be tried. The mechanism is one of several possible ways to accomplish this updating policy. It is a preferred updating scheme but does not indicate that any other mechanism is less effective or efficient. At the end of the section a brief discussion of alternative updating mechanisms is presented.

As indicated above, a search is made whether OLD-VLA is stored as a parent in the shadow. After OLD-VLA was found in a first level entry (27) in shadow, a test is made in step 249 to detect whether confirmation bit CF (31) is on. If CF=1, the respective pair of which OLD-VLA is a parent is valid and is left unchanged (the descendent in the second level entry (29) may or may not be the current address VLA). If CF=0, the pair of which OLD-VLA is a parent is invalid (it had caused a misfetch already, or the parent was newly entered in the last cycle). In this case, a check is made in step 251 whether the current address VLA is already stored as descendant in the second level entry (29). If it was not yet stored, it is now entered in step 253 into the second level but the confirmation bit CF is set to "zero" so that it will not yet be used for prefetching. If the current address VLA was already stored as descendant to OLD-VLA in the shadow, this could now be its second occurrence after OLD-VLA already, and therefore the confirmation bit CF is set to "1" to make the pair valid for prefetching (step 255).

With the final updating of the shadow in steps 249 . . . 255, the access cycle ends. In a final step 257, the current address VLA is placed into the OLD-VLA register so that it will be used as such in the next storage access cycle which will start at step 201.

(7) Alternative updating mechanisms:

Described above is a mechanism used to update the shadow address entries and to set the confirmation bit. The mechanism is a preferred updating scheme but does not indicate that alternative updating policies are less effective. The alternative updating schemes include:

(a) Preferential prefetching of first time entries:

Set the CF bit to "1" (good entry) for all new entries (top level) that enter the shadow. This allows all new entries to initiate a prefetch as soon as the first level entry is referenced. Set the CF bit to "0" (bad entry) if a prefetch is made and not used. New parent-descendant address pairs can be validated in the same manner as described above.

(b) Prefetch all:

Always prefetch the descendant address when a parent address is referenced. Use the setting of the CF bit to indicate only when a descendant address was prefetched and not used. This allows a new descendant address to be entered into the shadow for a first level parent address.

(E) EFFECT OF MULTIPLE-ENTRY PREFETCH CONFIRMATION BUFFER

As stated in section (C1), the prefetch confirmation buffer PCB (FIG. 5) may be a single-entry buffer or a multiple-entry buffer. With a single-entry PCB, the entry of one prefetch would be deleted, i.e. overwritten already when the next prefetch occurs. If the prefetched line were not used in the meantime, the respective pair would be invalidated in shadow already after a single misfetch.

In the case of a multiple-entry PCB, each entry lasts over a plurality of subsequent prefetches. Thus, the respective parent-descendant pair would have a chance to "survive", i.e. to remain valid in the shadow, even after a single misfetch, because it would not be invalidated immediately, and if a "good" prefetch were made for the same pair subsequently, its PCB entry would be confirmed by setting the usage bit UB to "1", thus avoiding the invalidation operation. The provision of a multiple-entry PCB thus has a smoothing effect by avoiding too frequent changes of address pairs in the shadow (in a similar way as the specific invalidating and follower-address replacement operations shown in steps 251 . . . 255 of the flowchart FIG. 6).

(F) ALTERNATIVE FOR GENERATION OF PARENT

In the embodiment described above, the parent-descendant pairs stored in shadow and used for prefetching have as parent as well as descendant the address of an information block accessed by the processor. This is a preferable choice if the prefetching mechanism is restricted to storage accesses which are made to obtain an instruction, as is done in the embodiment described.

However, in a general case where prefetching is done for both, instruction and data (operand) accesses, the usage of a specifically derived "parent identifier" as a parent PAR-A instead of just the respective information block address is more efficient for the subset of operand accesses. (For instruction accesses, the parent would always be the respective information block address, as described above).

A "parent identifier" is obtained as follows if a currently executed instruction requires the access to an operand: The low order bits of the last operand block address are concatenated to the low order bits of the last instruction block address to form a hybrid parent identifier. The combined length of the new parent identifier is equal to the length of the original instruction address or operand address.

Whenever a first level shadow lookup is to be performed, the search parent identifier now must be constructed from the current instruction block address and current operand block address in the same manner as the shadow entries were made.

The reason for not just using the block address of the respective operand as parent is the following: An operand may be used by different instructions with a different second operand. E.g., for instruction X the operand pair may be A and B, for instruction Y it may be A and C. By combining the addresses of X and A one generates a parent identifier for a descendant prefetching B, and by combining the addresses of Y and A one generates a parent identifier for a descendant prefetching C. Thus for the same operand A, different second operands B or C may be fetched depending on the situation.

Another alternative for obtaining the parent identifier would be to combine a portion of the respective block address with a selected bit group from the current PSW or from the current contents of any other predetermined indicator or status register. The optimum choice for the source of the parent identifier bits depends on the respective application.

We claim:

1. A method for prefetching blocks of information from main storage to a high speed buffer store in a data processing system, in which main storage addresses of said information blocks contained in said high speed buffer store are stored in a directory, wherein the following steps are executed for each access of at least a subset of accesses to high speed buffer stored information blocks by a processor of said data processing system:

determining for each access to an information block in the high speed buffer store, whether the respective information block is the most-recently used;

updating an additional shadow directory having first and second level entry positions and prefetching an information block into said high speed buffer store if said access is not to said most recently used information block; and not performing said updating and prefetching in case of access to a most-recently used information block;

storing a parent identifier which is derived from the respective current-access block address, in said first-level position of said additional shadow directory if it is not stored therein already, and the address of a subsequently accessed block as a descendant address in said second-level position of said shadow directory, associated with said first-level position, or determining if a valid parent identifier/descendant address pair is available having said parent identifier in said first level, wherein said validity is determined according to whether on a subsequent access cycle said block address was followed by said described address, and if a parent identifier derived from the respective current-access block address is already stored in a first-level position of said shadow directory, obtaining from a respective associated second-level position a descendant address if validly stored therein, and prefetching the information block identified by said obtained descendant address from main storage into said high speed buffer store if it is not resident therein already, and not obtaining said descendant address if not validly stored therein and not prefetching said descendant address if it is already in said high speed buffer store.

2. The method in accordance with claim 1, characterized in that:

if the parent identifier derived from a current-access block address is not found in a first-level position of said shadow directory, it is entered in a first-level position having the least-recently used entry, and a subsequent block address actually used after said current-access block address is stored in a subsequent access cycle in that second-level position of the shadow directory which is associated with the first-level position where said parent identifier was stored.

3. The method in accordance with claim 2, further comprising the steps of:

storing a confirmation bit in said shadow directory according to said validity of a parent/identifier descendant address pair in association with each parent identifier in a first-level position.

4. The method in accordance with claim 3, wherein:

if a prefetch operation is made using a validly stored descendant address from a second-level position of the shadow directory, the respective descendant address and its associated parent identifier from the associated first-level position are stored in first and second registers of a prefetched confirmation buffer;

a determination is made subsequently whether the prefetched information block in the high speed buffer store is actually fetched by said processor, and if the prefetched information block was not used by said processor, the confirmation bit associated with the respective parent identifier is reset to a value that prevents further use of the respective descendant address for prefetching.

5. The method in accordance with claim 4, further comprising the steps of:

storing a plurality of descendant addresses which were used for a prefetch operation, and their respective associated parent addresses as prefetch address pairs respectively in said first and second registers of said prefetch confirmation buffer, resetting a usage indicator bit associated with each entry in said prefetch confirmation buffer to a first binary value when a prefetch address pair is stored in the respective entry, setting said usage indicator bit of any stored prefetch pair to a second binary value if said information block prefetched with the descendent address of the respective prefetch address pair is actually subsequently accessed in the high speed buffer.

6. The method in accordance with claim 5, characterized in that if a first prefetch address pair is replaced in said prefetch confirmation buffer by a prefetch address pair occurring after said first prefetch address pair the value of the usage indicator bit of the old prefetch pair is tested and, if the usage bit of said replaced first prefetch address pair still had the first binary value, the confirmation bit associated with the parent identifier of the respective replaced prefetch address pair, is reset in the shadow directory to a binary value that prevents further use of the descendant address stored in the associated second-level entry for prefetching.

7. The method in accordance with claim 1, characterized in that:

in the shadow directory, more parent identifiers are maintained in first-level positions than information blocks are stored in the high speed buffer store, so that parent identifiers derived from the block addresses of information blocks that were replaced already in the high speed buffer store are still present in the shadow directory.

8. The method in accordance with claim 1, further comprising the steps of:

determining whether said access to said high speed buffer store by said processor is for instructions or operands, and updating said shadow directory and prefetching said instructions into said high speed buffer store only if said access is for instructions, whereas for an access to operands, no addresses are stored in said shadow directory and said prefetching operation is not performed.

9. The method according to claim 3 wherein said directory of the high speed buffer is separated into a number of associative classes and the shadow directory is separated into the same number of classes.

10. The method according to claim 2, wherein a usage-age indication is maintained for entries in the high-speed buffer store and in its directory, said method further comprising the step of:

making the subsequent block address stored in the second-level position of the shadow directory the address of the first information block whose access changes said usage-age indication.

11. The method according to claim 2, further comprising the step of:

making the subsequent block address stored in the second-level position of the shadow directory the address a next block that is not in the high-speed buffer and must be fetched from main storage when access is attempted.

12. The method according to claim 1, wherein;

for each access to an information block by the processor, a determination is made whether the access is for an instruction or for an operand, and if the access is for an instruction, the parent identifier derived is the information block address actually used for that access, if the access is for an operand, the parent identifier derived is a concatenation of a portion of the address of the information block containing the currently executed instruction, and of a portion of the address of the information block containing the operand to be accessed and said descendant address is a second operand.

13. The method according to claims 1, 2, 4, 5, 6, 7, 8 or 9, wherein said directory of the high-speed buffer is separated into a number of set-associative classes, and said shadow directory is separated into the same number of classes.

14. A cache buffer storage apparatus in a data processing system, for enabling prefetching of information lines from a main store to a high speed cache buffer store, and including a real cache directory, comprising:

a secondary cache directory comprising a plurality of entry position pairs, each pair including a first-level entry position for a parent indentifier and an associated second-level entry position for a descendant address, means for determining for each access to an information block in the high speed buffer store, whether the respective information block is the most-recently used; and means for updating said secondary cache directory and for prefetching an information block into said high speed buffer store if said access is not to said most recently used information block and for not updating and prefetching in case of access to a most-recently used information block, means for deriving said parent identifier from respective current-access block addresses and storing said parent identifier in said first level entry position, means for storing the address of a subsequently accessed block as a descendant address in said second level entry position of said secondary cache directory, means for determining if a valid parent identifier/descendant address pair is available having said parent identifier in said first level entry position, wherein said validity is determined according to whether on a subsequent access cycle said block address was followed by said descendant address, means for obtaining a descendant address from the associated second level entry if it is a member of a valid pair, and if a respective current-access block address is already stored in a first-level position of said second cache directory, and means for prefetching the information block identified by said obtained descendant address from said main store into said high speed buffer store if it is not resident therein already, and not obtaining said descendant address if not validly stored therein and not prefeteching said descendant address if it is already in said high speed buffer store.

15. The apparatus in accordance with claim 14, wherein:

the number of said entry position pairs in said secondary cache directory is at least twice as large as a number of entry positions in said real cache directory, the number of entry positions in said real cache directory corresponding to the number of information block storage areas in said cache buffer store, wherein said first-level entry positions in said secondary cache directory are sufficiently in number to hold as parent identifiers addresses of information blocks that are presently stored in cache as well as of information blocks that are no longer stored in cache.

16. The apparatus according to claim 14 comprising:

a field for confirmation indication for each said entry position pair in said secondary cache directory, means for determining the validity of said entry position pairs in accordance with address sequences requested by said processor, wherein the address pair contained in the respective entry position pair is designated as valid or invalid in said field.

17. The apparatus according to claim 14 wherein:

the cache buffer store and its real cache directory and the secondary cache directory are subdivided into set-associative sections, said apparatus further including, replacement means for the secondary cache directory, for replacing secondary cache entry position pairs according to the usage of information blocks identified by said parent identifier/descendant address pairs, separately for each set-associative section.

* * * * *